United States Patent [19]

Westermo et al.

[11] Patent Number: 5,086,651
[45] Date of Patent: Feb. 11, 1992

[54] STRAIN MONITORING APPARATUS AND METHODS FOR USE IN MECHANICAL STRUCTURES SUBJECTED TO STRESS

[76] Inventors: Bruce Westermo, 5151 Longbranch Ave., San Diego, Calif. 92107; Larry D. Thompson, 795 Lingel Dr., El Cajon, Calif. 92019

[21] Appl. No.: 584,734

[22] Filed: Sep. 19, 1990

[51] Int. Cl.$^5$ ................................................. G01B 7/16
[52] U.S. Cl. ........................................ 73/763; 73/770; 73/779; 73/786; 324/209; 340/665
[58] Field of Search ................. 324/209; 73/770, 760, 73/779, 763, 767, 768, 772, 775, 776, 786; 340/665; 116/212

[56] References Cited

U.S. PATENT DOCUMENTS 4,931,730  6/1990  Olsen et al. .................. 324/209

FOREIGN PATENT DOCUMENTS 48906  6/1989  Japan .......................... 73/784

OTHER PUBLICATIONS

G. J. Kostyrko, Strain Gage Instrumentatin, 5-Story Steel & Concrete Building, Proceedings of the 57th Annual Convention of the Structural Engineers Association of California (Oct. 4-9, 1988).

Dove, R. C. et al., Experimental Stress . . . Measurement, Charles E. Merrill Books, Inc., Columbus, Ohio, pp. 13–15.

Primary Examiner—Jerry W. Myracle
Attorney, Agent, or Firm—Timothy J. Martin; Dana S. Rewoldt

[57] ABSTRACT

Devices and methodology are provided for measuring mechanical strain in a structural member. The devices and methodology utilize a material which undergoes a change in phase when strained so that measurement of the phase change indicates strain. Preferably the phase change material is a transformation induced plasticity steel alloy. The elements may be configured as gauges secured to a structural member, but also the elements may perform as part of the structure. A plurality of elements may be organized into a monitoring system, either passive or active, for a complex structure.

49 Claims, 8 Drawing Sheets

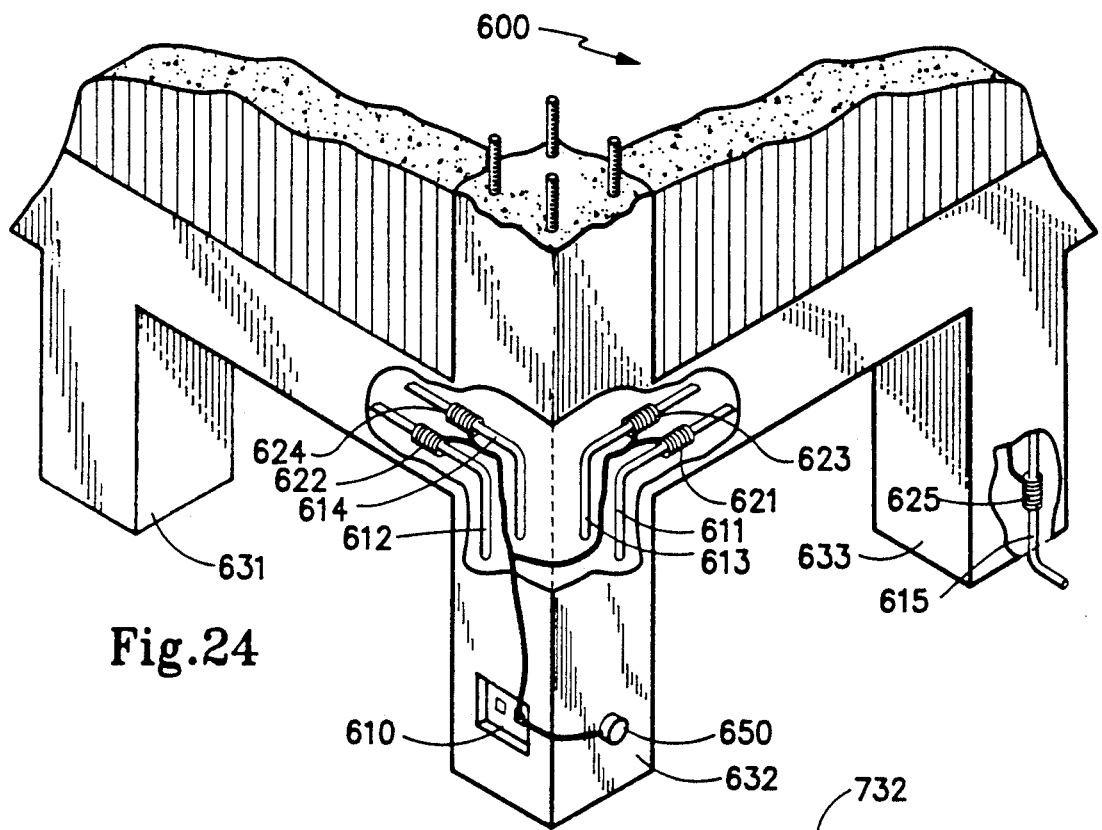
Fig.24
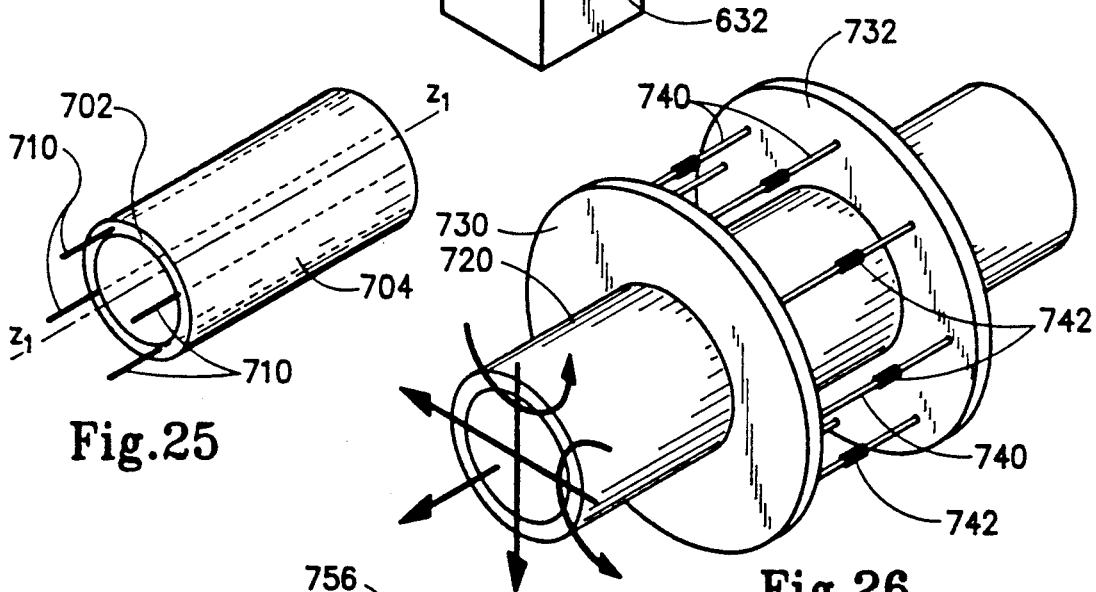
Fig.25
Fig.26
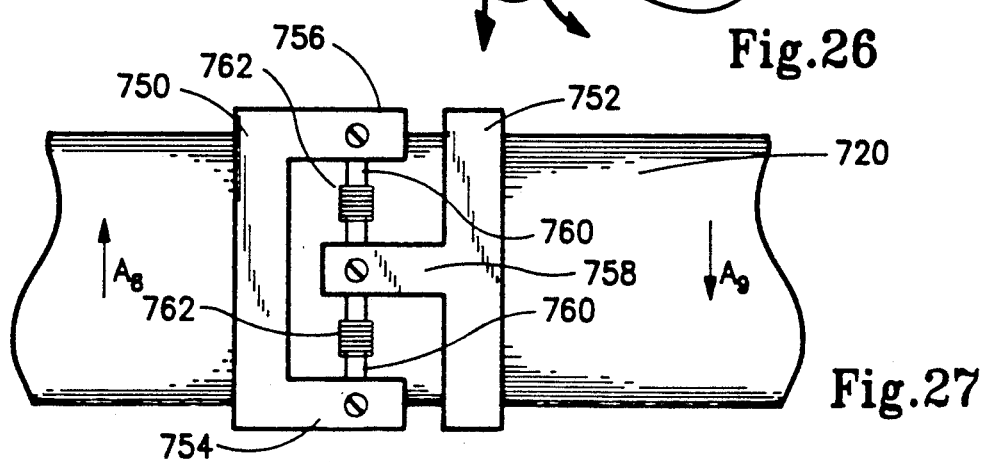
Fig.27

STRAIN MONITORING APPARATUS AND METHODS FOR USE IN MECHANICAL STRUCTURES SUBJECTED TO STRESS

FIELD OF INVENTION

The present invention is directed to the field of measuring and monitoring stress within structures of virtually any type. Examples of such structures, without limitations, include buildings, bridge works, pipelines, dams, roads, aircraft and machinery. In its most general form, however, the present invention is directed to the field of measuring the strain existing between two spaced-apart locations regardless of the medium in which the stress and strain occurs.

BACKGROUND OF THE INVENTION

Every mechanical structure is inherently subjected to mechanical stress of one type or another. Where the structure is located in a gravitational field, for example, the mere presence of the gravitational force causes certain strain to be placed upon the component parts of that structure. Most physical structures are engineered to withstand such background stress; however, in many environments, it is not unusual for abnormal stresses to be applied to such structures, from time-to-time. These abnormal stresses may come from environmental events, such as earthquakes, but also from the use of the structure, such as a bridge or from operation of the structure, such as a machine, in the normal course of activity.

For example, buildings receive variable loading conditions as a result of human use, wind currents, vibrations, etc. Bridges are subjected to varying loads as a result of traffic thereacross (and the vibrations caused thereby), wind currents and tidal currents, to name a few. Where any structure is coupled to the ground, this structure may be subjected to thermal loads, soil/structure interaction (creep, settlements, and consolidation) and unusual loads caused by earthquakes or other natural disasters. Machinery, such as ships, aircraft, industrial equipment and the like, encounter varying load forces as a condition of their operation since the machinery normally operates by applying a force to some resistance in order to produce work. Thus, the structural members of machinery must bear the loads caused by the application of the force.

The present invention concerns measuring strains on structural systems, although the present invention can be used to monitor strain between any two locations susceptible to the attachment of a strain element according to the present invention. Thus, not only can the present invention monitor strain on structural members, but also the present invention can measure dislocation between two points and can monitor strain, for example, in a soil or substrate medium.

The need for strain measuring devices is unquestioned. It is well known that natural disasters often excessively strain a structure so as to make that structure unfit for occupation or use. Indeed, even a normal use of a structure or normal use of machinery may degrade the system beyond tolerable levels. In either event, current precautionary techniques require visual inspection of the structure, and, sometimes, the inspector must make numerous empirical measurements in an effort to estimate degradation of the structural system. In large constructions, such as buildings, dams, roadways, and the like, it is not only possible but also probable that structural damage due to strain is suffered by the internal structural members of the system. In such instances, damage is almost impossible to estimate due to the inaccessibility of the structural members to observation. Even where the structural members comprising the structural system may be viewed and/or measured, the evaluation process is time consuming and costly. Where only a limited number of inspectors are available, a backlog can result preventing occupancy and use of the structures, for example, as would occur after an earthquake or natural disaster. Further, where a structural member has been strained, but subsequently returns to its original shape or to a less strained state, inspection may not reveal the true magnitude of degradation. Indeed, it is therefore possible that unsafe structures could pass inspection where the strain degradations are hidden.

The existence of strain gauges, as analytical apparatus, has heretofore been known. For example, electrical strain gauges have been developed and may be normally grouped into four types: (1) capacitance gauges; (2) inductance or magnetic gauges; (3) piezoelectric gauges; and (4) resistance gauges. Of these, one of the most prevalent is the inductance gauge wherein a measurement of strain, as a function in a change in length, occurs by the displacement of an inductive element relative to a conductive coil so as to change the inductance of the electronic circuit resulting in a change in current flow therethrough. This change in current flow creates a strain signal that may then be magnified by any suitable electronic means. Similarly, capacitive strain gauges operate by relative movement of capacitive plates or a dielectric medium to change the capacitance of the system thereby generating a signal indicative of relative movement between the points subjected to strain. Resistive strain gauges react to changes in resistance on wires due to strain deformation of the wire. Piezoelectric strain gauges operate on the current generation of piezoelectric crystals placed under strain to produce a strain measurement.

Despite the development of these strain gauges, little has been done to incorporate strain gauges in structural systems as an analytical tool to measure stress on the structure. In part, this may be due to the high cost of existent strain gauges, but also, these gauges are fairly complex in construction and relatively fragile. Thus, operation and measurement requires a relatively high level of skill, and constant use in situ would likely lead to unacceptably high maintenance and lack of reliability. Accordingly, there remains a need for an improved strain gauge element and strain gauge devices which are relatively inexpensive to produce and easy to use and operate.

SUMMARY OF THE INVENTION

It is an object of the present invention to provide a new and useful strain gauge element formed of a material so that the strain gauge uses a different physical phenomenon as an indicator of strain in a structure.

It is another object of the present invention to provide a new and useful method for measuring strain in a structure resulting from stress.

Yet another object of the present invention is to provide apparatus and methodology wherein strain on a structural system may be measured by observing a phase change in a material forming a strain gauge element.

Still a further object of the present invention is to provide apparatus and methodology wherein structural members or components in a structural system may be fabricated, in whole or in-part, utilizing a material that under goes a phase change from a non-ferromagnetic state to a ferromagnetic state in response to strain.

Still a further object of the present invention is to provide an apparatus and method for measuring peak strain on a structure over an interval of time.

It is a still further object of the present invention to provide a monitoring system for structures that is non-consumptive in power yet which may be interrogated to provide measurement of the degradation of the structure due to stress.

In order to accomplish these objects, the present invention provides a device for measuring mechanical strain on a structural member. In its broad form, the device includes a piece of material formed out of a substance which changes phase in response to stress. This piece of material is secured to a structural element, for example, in a structural system, by appropriate mounts so that relative movement between the two mount locations resulting from stress on the structure places strain on the piece of material. Instrumentation for the measurement of the phase change is then provided so that the degree of phase change may be used to calculate a strain, and therefore the degree of degradation, in the structural member.

Preferably, the strain element according to the preferred embodiment of the present invention utilizes material which changes phase, and hence its magnetic properties in response to strain. Specifically, according to this disclosure, a strain element is formed out of a transformation induced plasticity (TRIP) alloy steel which, as is known, under goes an irreversible change from a non-ferromagnetic to a ferromagnetic state proportionally in response to strain. This strain element is preferably a tensile element which, for example, may be mounted between a pair of mounts so that relative movement of the mounts places tension on, and thus stretches, the tensile element causing the TRIP steel alloy to increase its ferromagnetic property. In one embodiment, a coil surrounds the tensile element and measurement of the magnetic inductance is accomplished by measuring current through the coil. In another embodiment, a web-like array of TRIP wires may be embedded in the skin of a structure, such as an airplane wing, and the magnetic inductance may be measured by an independent coil placed in proximity to the web-like material. Alternately, the TRIP element may be a plate or coating on a structural element and the change in magnetic inductance measured by any convenient instrument, as known in the art. In the embodiments disclosed in this application, it is also shown that the strain element may be a structural member of the structural system or may be an auxillary element attached to the structure. In the former case, for example, the strain element may be a wire, cable, plate, beam, column or other structural member and can likewise be a fastener, such as a screw, bolt, rivet, and the like, used to connect two structural members together.

Where a single tensile element is used, the strain gauges according to the present invention can measure a single strain resulting, for example, from compression or tension. However, as disclosed herein, strain gauges can be constructed to measure strains in multidimensions, for example, as would result from combined normal and shear stressing.

Accordingly, the present invention may be incorporated in virtually any type of structure, including machinery, which is subjected to stress. The method and apparatus of the present invention, therefore, may be used in such diverse areas as bridges and roadways, dams, buildings, pipelines and machinery, such as airplanes or large industrial equipment to name a few.

Furthermore, the phase changing tensile elements and strain gauges which incorporate these tensile elements may be integrated into a system that is operative to measure strain on structural members joined together in an integrated structure. Thus, degradation resulting from stress, including dislocation of structural components, may be quickly and easily evaluated. In the system, a plurality of detection elements are disposed at selected locations throughout the structure and are connected to the structural members so that stress on each respective structural member strains the phase change material in its respective detection element. This phase change is measured by any convenient method. In these systems, some of the detection elements may be connected to this structure at monitor points to defined dislocation monitor elements for registering relative dislocation between the monitor points. Other detection elements may actually measure strain on specific structural members, as selected. In some instances, the detection elements may be embedded in a structure, such as a roadway or dam as a means for mounting the detection element to the structure. Deformation of the structure may thus be monitored in two or three dimensions over a time interval. The phase change measuring instrumentation may be a detector located externally of the structural members or may be an on-site instrumentation. In either event, it is preferred that the strain gauges of the system be linked to a central monitor station. In either event, the instrumentation generates an interrogation signal that is transmitted to each detector element, with this interrogation signal being of such character as to be affected by phase changes in the material of the respective detection element so that, as a modified signal, it may be received by the instrumentation which generates output indicative of the phase change of the detection element. This modified signal may be processed to generate a calculation of the strain occurring at the respective detection element. If desired, this output may be used to generate an alarm signal indicative of an unsafe condition for the structure.

From the foregoing, it should be understood that the broad method of the present invention measures strain in a structure and incorporates several basic steps. First, a piece of material formed of a substance which undergoes a change in phase in response to strain is incorporated into a structure in a manner such that the piece of material will be strained correspondingly to the strain to be measured in the structure. Second, the phase change in the material is measured as an indicator of the strain resulting therefrom. The piece of material may be incorporated as a structural member, the piece of material may be embedded into the structure or the piece of material may be attached as an auxiliary element on a structural member. Preferably the piece of material is configured as a tensile element so that the step of incorporating the element into the structure may be accomplished by providing spaced-apart anchors to secure opposite ends of the tensile element or by embedding the element in the structure. Again, the material is preferably one which changes phase from a non-ferromagnetic state to a ferromagnetic state in response to strain and the step of measuring is accomplished by measuring a change in the magnetic inductance of the material.

These and other objects of the present invention will become more readily appreciated and understood from a consideration of the following detailed description of the preferred embodiment when taken together with the accompanying drawings, in which:

BRIEF DESCRIPTION OF THE DRAWINGS

FIG. 24 is a perspective view, broken away, showing a strain measuring system for use in a building structure according to the present apparatus and methodology;

FIG. 25 is a perspective view of a pipe having embedded therein strain elements according to the present invention;

FIG. 26 is a perspective view showing a strain gauge device mounted externally on a pipe according to the present apparatus and methodology; and FIG. 27 is a top plan view of a strain gauge device for measuring torsional forces on a rod or pipe according to the present apparatus and method.

DETAILED DESCRIPTION OF THE EXEMPLARY EMBODIMENTS

The present invention concerns the measurement of strain in various structures. From an apparatus standpoint, the present invention, in its broad form, includes new and useful strain detection elements which may be formed into indepedent strain gauges that are mountable to a structural member and which may be monitored to measure a strain of that particular member. Alternatively, the strain detection elements may be incorporated into the structure, either as primary or secondary structural members or by being embedded into the body of the structural member. The invention therefore contemplates a measurement system which may be integrated into large structures so as to be used in monitoring numerous strain locations within that structure. Accordingly, in its broad form, the present invention is also directed to new and useful methodologies for measuring the strain in a structural member and in complex structures comprising large structural members or numerous structural members.

Figure 1A:
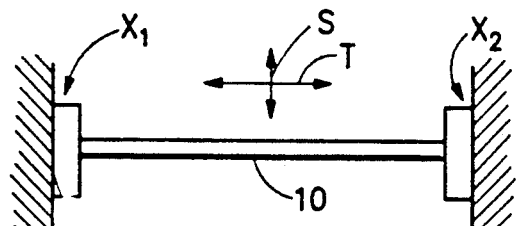
FIGS. 1(a) and 1(b) are diagrams showing a structural member in axial stress, with FIG. 1(a) being a member in tension and FIG. 1(b) being a member in compression.
Figure 1B:
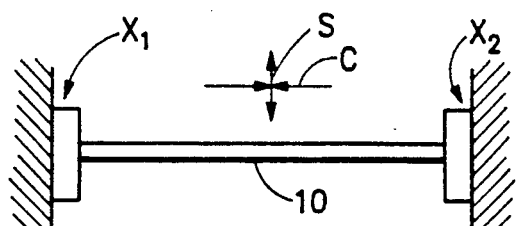

With reference to FIGS. 1(a) and 1(b), therefore, it may be seen, that where a representative structural member 10 longitudinally extends between a first location $X_1$ and a second location $X_2$, the structural member 10 may be subjected to an axial tension force T, shown in FIG. 1(a), or a compression force C, shown in FIG. 1(b). In either event, structural member 10 may be subjected to a transverse shear force S. In the single dimension $X_1$-$X_2$, it may be appreciated that there are therefore two stresses, an axial stress and a shear stress, with stress being defined as force per unit area as is well known in the mechanical arts. Since, in reality, a structural member is three dimensional, there are therefore six different stresses which may act on the three dimensional object. Namely, there are three axial forces corresponding to the reference coordinate axes and three shear stresses, with one shear stress corresponding to each respective axial stress.

Mechanical strain is a natural result of stresses on the material. Normal strain is measured as a percentage change in length of the material in the dimension being measured. Thus, by way of illustration, if an axial stress causes a doubling in the length of an axial element to which it is applied, then that element has 100% axial or normal strain. Similarly, if the axial force is compression, and the stress results in a decrease to ½ of the original axial length, the material has been −50% strained. The ability to measure the strain on the material allows the calculation of degradation of the strained member and, by knowing the properties of the member itself, allows calculation of the stress which resulted in the strain, all as is well known in the field of mechanical engineering. Accordingly, for a known structural member, knowledge of the stress allows calculation of the strain or, alternately, knowledge of the strain allows calculation of the stress.

As noted in the background section of this invention, there have been several different varieties of strain gauges developed in the past for purposes of measuring the strain on a member since it is often more convenient to measure strain as opposed to measuring stress. These devices have accomplished strain measurement by the relative movement of a ferromagnetic core with respect to measurement coils, the relative movement of capacitive plates or dielectric media, the change in the electrical resistance resulting from strain deformation or the production of electric current from a piezoelectric device undergoing strain. The present invention adds what is believed a revolutionary fifth technique to the four techniques described in the prior art, namely, the change in phase of a strained material. In its specific form, the preferred embodiment of the present invention relies on a measurement of magnetic inductance similar to the induction type gauges; however, the physical mechanism (phase change) for the relative change in magnetic induction is entirely different from that heretofore utilized in strain gauges. In its generalized form, gauges made according to the teachings of the present invention may therefore be termed to be phase change gauges.

A. Phase Change Materials

The development of the present invention springs from the recognition by the Applicants that materials which change phase proportionally to strain can be adapted to measure strain on a structural member. Phase change, in its broadest form, is simply the alteration of a physical property of the material from one state to another. For example, a change in phase may occur between solid to liquid, liquid to gas or solid to gas. A phase is commonly defined as a uniform, homogeneous body of matter which is physically distinct from other such bodies of matter. In crystalline solids the atoms comprising the material are arranged in a specific periodic array known as the lattice. The properties exhibited by a crystalline solid depend on the particular three-dimensional array or "crystal structure" assumed by the atoms. These different phases can produce changes in the magnetic, electrical, optical, and mechanical (to list a few) properties or behavior of the material.

While, in its broadest form, the present invention contemplates that a different phase change in materials may be incorporated into strain gauges or used to provide strain detecting elements, the primary material currently recognized by the inventors that is particularly useful as a strain element is that material known as transformation induced plasticity alloy steel which is known by its acronym TRIP alloy steel.

Some solids, such as iron, can exist in more than one atomic arrangement, depending on the temperature, pressure, or other environmental influences. The stable form of iron, under ambient conditions, is body-centered-cubic; however, by alloying iron with other elements, the atoms can exist in metastable crystal structures such as face-centered-cubic. In the 1960's it was realized that materials which existed in the metastable face-centered-cubic atomic orientation would transform to a more stable arrangement under the influence of applied stress (or strain). As a result the deformation characteristics of these materials were found to be unique in their combinations of attainable strength with fracture resistance, or toughness. Since the improved mechanical properties were the result of the phase transformations which occurred during the elastic and/or plastic deformation these steels were given the acronym TRIP (TRansformation Induced Plasticity) steels. TRIP alloy steels are iron-based alloys which may contain elements such as manganese, carbon, nickel, chromium and molybdnenum (to list a few).

As mentioned above, TRIP alloyed steels were developed specifically for their higher strength and toughness plus their potential for producing structural members of greater strength per unit weight. While the magnetic properties of TRIP alloy steels were noted and the ability of these materials to change phase was noted, there simply was no interest exhibited historically in this feature apart from their strength. While these materials were investigated briefly as a potential material within which to encase radio-active wastes, this technology never developed. Thus, there has been virtually no application of these materials other than as high strength and high toughness structural elements.

As noted above, one attribute of TRIP steel alloys is a phase change under loading. The family of TRIP steel alloys are in a face centered cubic phase when in an unloaded state. That is, each unit cell in the crystalline structure has an atom located at the corner of a cube and another atom centered on each face of the cube. This phase is metastable and is different from the normal atomic packing of iron-based alloys which is body-centered-cubic in their stable phase. "Body-centered-cubic" is an atomic packing wherein each unit cell has an atom located on the corner of the cube with another atom being located in the center of the cubic cell.

Applicants have recognized that TRIP steel alloys change phase from an unloaded or virgin state wherein the phase is the metastable face-centered-cubic structure to the stable body centered cubic structure in proportion to the amount of loading on an element constructed of TRIP steel alloy. This phase change has two properties which allow the material particular utility in strain measurement apparatus and methodology. First, the change in phase from the face centered cubic structure to the body centered cubic structure causes a resulting change in the magnetic property of the material, namely, from being non-ferromagnetic to becoming ferromagnetic. Second, this phase change is irreversible.

Figure 2A:
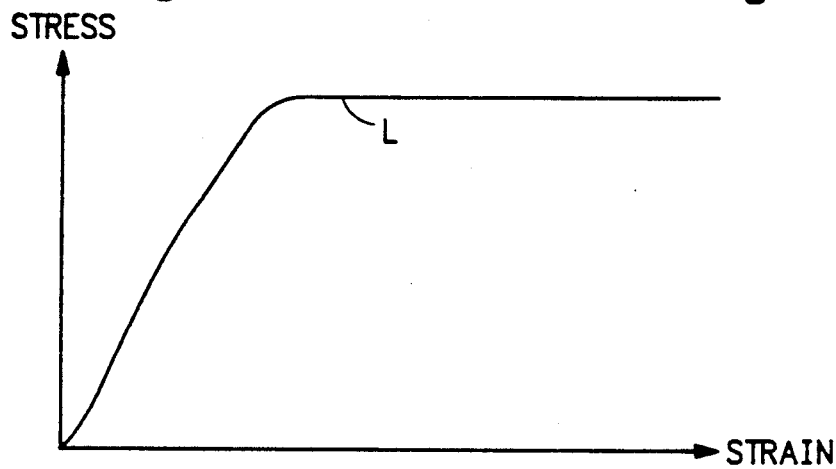
FIGS. 2(a) and 2(b) are diagrams showing a stress versus strain curve and a percentage magnetic material versus strain change curve for exemplary TRIP steel alloy tensile elements.
Figure 2B:
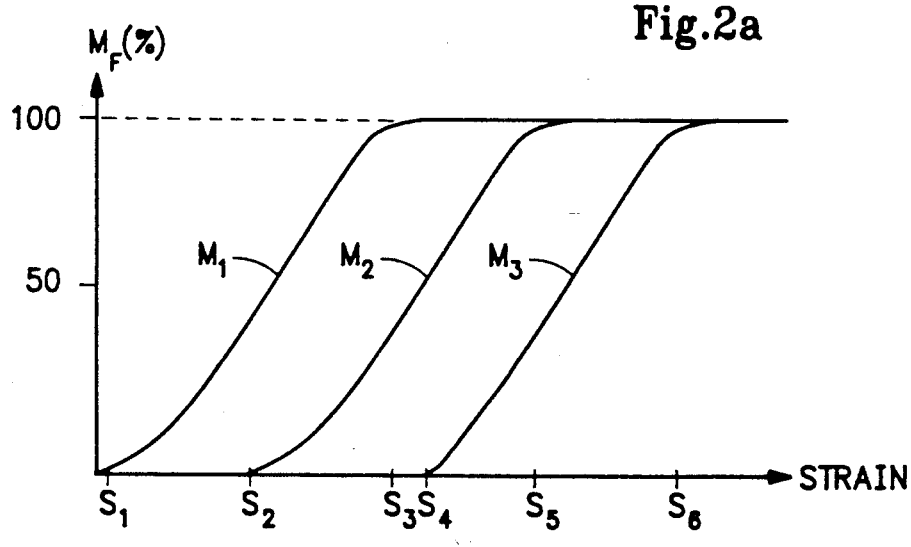

As is shown in FIG. 2(a), it may be seen that the virgin loading curve L indicates that strain and stress are proportional to one another. In FIG. 2(b), it may be seen that, for such TRIP alloy steels, the percentage of ferromagnetism $M_f$ is a function of strain and, that the composition of the particular alloy may be constructed so as to shift the ferromagnetic curve so that different ranges of strain may be measured by different alloyed composition thus revealing that different materials will exhibit different sensitivities and responses. Thus, for example, a first ferromagnetic curve $M_1$ has a dynamic range between strain $s_1$ and $s_3$ within which the percentage of ferromagnetism may be used to measure the strain on the material. Similarly, ferromagnetic curve $M_2$ has a dynamic range within which strain can be measured between points $s_2$ and $s_5$. Finally, ferromagnetic curve $M_3$ has a dynamic range corresponding to measureable strain range between $s_4$ and $s_6$. Because of the overlap of the dynamic ranges of the curve $M_1$, $M_2$ and $M_3$ it may be seen that for the three elements graphed in FIG. 2(b), the respective ferromagnetic percentages of the three elements provide a dynamic range extending of measurable strain between points $s_1$ and $s_6$.

Applicants have recognized that the change from a non-ferromagnetic state to a ferromagnetic state over the respective detectable ranges can be utilized to measure strain in an easy, inexpensive manner which has heretofore not been recognized. Also, that different strain elements may be tailored by the composition of the alloys to create strain elements of differing sensitivities having different measurable strain ranges which may be used alone or in combination to create strain gauges having a desired sensitivity. Finally, since the change from the non-ferromagnetic state to the ferromagnetic state is irreversible, strain elements constructed of TRIP steel alloys have a secondary benefit of being able to measure peak strain that has occurred on the element due to stress deformation even if subsequent opposite stress deformations return the element to its original configuration. Thus, even where a material appears not to have been strained because its deformation has been reversed, the TRIP steel alloy element nonetheless will allow measurement of the maximum strain to which the element was previously subjected. This, in turn, has significant benefits in apparatus and methodologies of measuring the strain on various structures.

B. Single Strain Measuring Elements and Gauges

Figure 3:
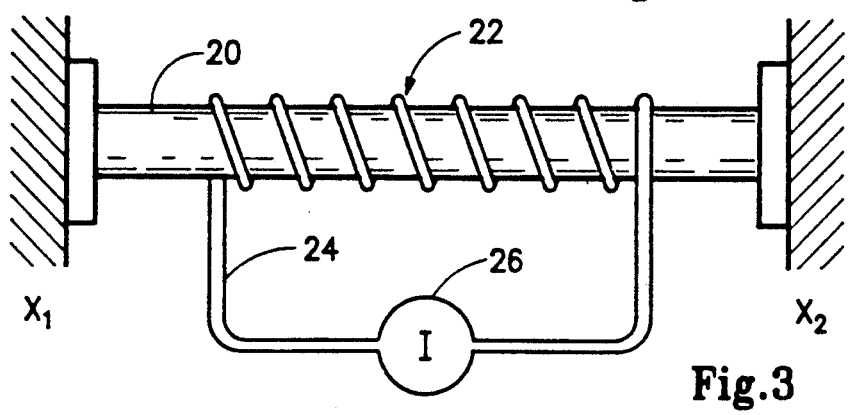
FIG. 3 is a diagram showing a representative strain element according to the present invention including a piece of phase change material.

FIG. 3 the fundamental form of the present invention wherein a strain element 20 extends between locations $X_1$ and $X_2$, similarly to the member 10 in FIGS. 1(a) and 1(b). Strain element 20, according to the present invention, is formed of a selected TRIP steel alloy of the type described above. Coil 22 of a wire 24 is wrapped around element 20 and is connected to a magnetic induction meter 26 which may detect the magnetic inductance of element 20. When there is relative movement between locations $X_1$ and $X_2$, caused by a stress, element 20 under goes strain which, as described above, alters its state from non-ferromagnetic to ferromagnetic, with the percentage of ferromagnetism being proportional to the strain. Between the range of 0% ferromagnetism and 100% ferromagnetism, the magnetic induction for coil 22 changes. The reason for this is that element 20 forms a core for coil 22 which core changes in ferromagnetic properties proportionally to strain. The change in ferromagnetism of the core correspondingly and proportionally changes the magnetic induction of coil 22, as is well known, which may be measured by magnetic induction meter 26. Thus, meter 26 can readily be calibrated so that it measures the percentage ferromagnetism in element 20 and thus the strain thereon.

Figure 4:
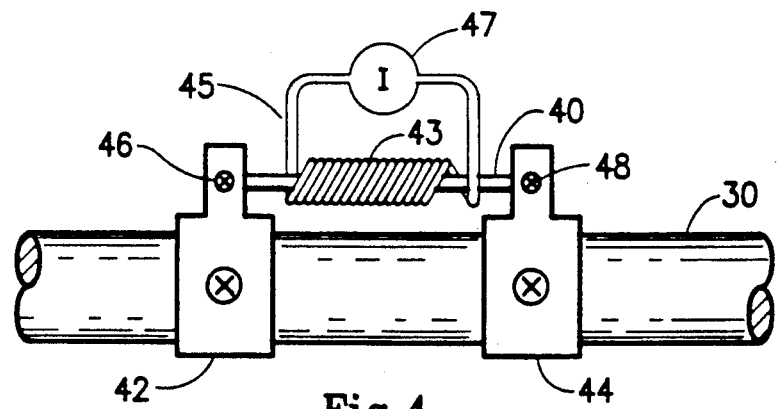
FIG. 4 shows a strain gauge element and measuring instrument according to the present invention mounted to a tension cable.

This strain element 20 thus suggests devices which may be used to measure strain on a structural member. For example, as is shown in FIG. 4, a cable 30 is represented which may under go a tension as a stress. A TRIP steel alloy element in the form of a TRIP wire 40 is mounted between a first mount 42 and a second mount 44 that are secured to cable 30 so that any stretching of cable 30 causes mounts 42 and 44 to move apart from one another. Relative movement of mounts 42 and 44 causes a stretching of wire 40 by virtue of its attachment points 46 and 48 so that wire 40 is strained directly proportionally to the strain on cable 30 due to axial tension. The magnetic induction through coil 43 may be measured by meter 45 so that strain on cable 30 may be directly measured.

Figure 5:
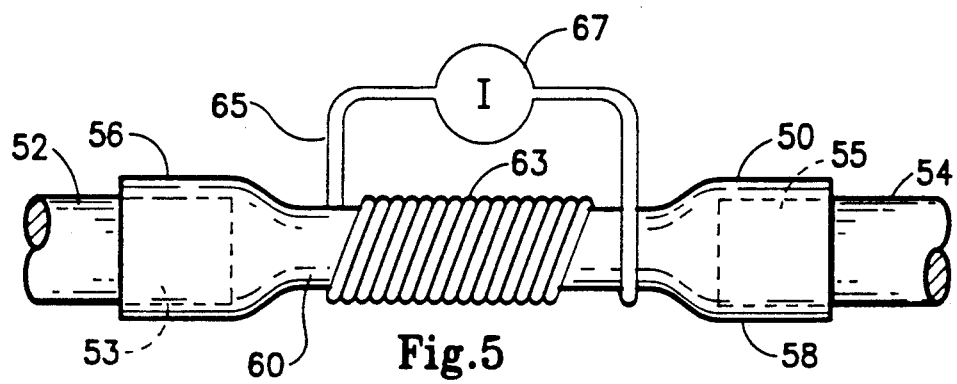
FIG. 5 is a top plan view showing a strain gauge element and measuring instrument used to interconnect a pair of cables.

FIG. 5 shows a TRIP steel alloy connector 50 being used as a secondary structural member to interconnect primary structural members in the form of cables 52 and 54. Here, it should be appreciated that, since the TRIP steel alloys have high strength properties for which they were initially developed, they may be used as connectors or fasteners to interconnect primary structural members together and measure the strain occurring on the combined structural system, for example, cables 52 and 54. Here, it may be seen that structural element 50 is affixed by mounts 56 and 58 to cable ends 53 and 55, respectively, with element 50 having a central portion 60 of reduced dimension which is encompassed by a coil 63 of wire 65 connected to meter 67. Axial deformation of central portion 60 in the form of lengthening due to tension on cables 52 and 54 results in the change in phase of central portion 60 which may be monitored by induction metering and induction measuring instrument 67, as described above.

Figure 6:
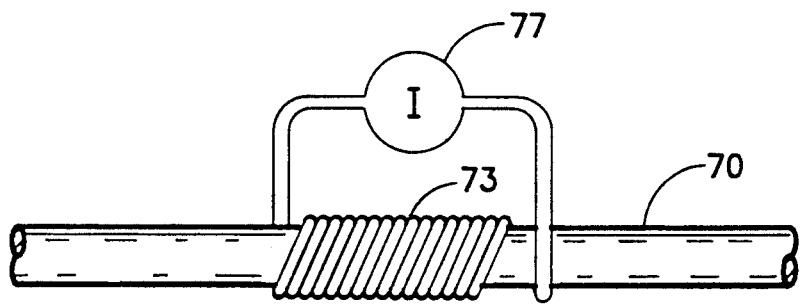
FIG. 6 is a top plan view showing the use of a phase changing material as a structural cable along with a measurement instrument therefor.
Figure 7:
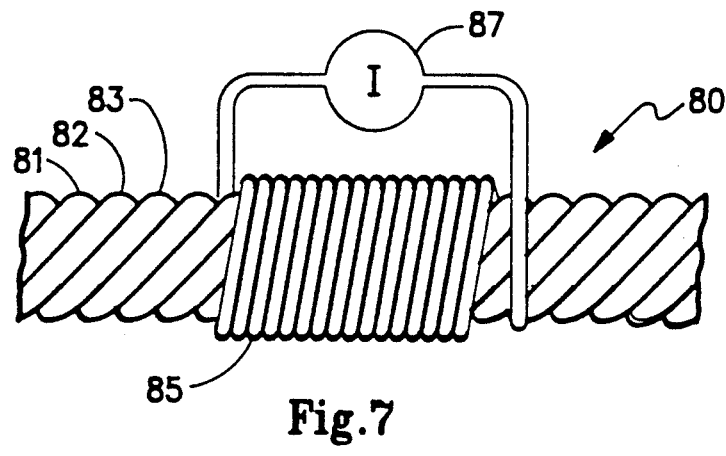
FIG. 7 is a top plan view showing a multi-strand cable constructed of a phase change material according to the present invention.

Again due to the additional property of TRIP steel alloy materials of being high strength, it should be understood that the TRIP steel alloy material itself may constitute a primary structural member so that, as is shown in FIG. 6, a cable 70 may itself be constructed entirely of TRIP steel alloy. Where the TRIP alloy steel is used as the primary structural member, it is simply a matter of providing a wire coil 73 connected to meter 77 to measure the relative percentage of ferromagnetism in cable 70 to determine the strain on cable 70 resulting from tension stresses. Similarly, it may be seen that, in FIG. 7, a cable 80 may be constructed of multiple strands 81, 82 and 83, one or more of which may be a strand of TRIP steel alloy cable. Cable 80 comprises a primary structural member the strain on which may be measured by an instrument 87 connected to coil 85 which encircles cable 80. With reference to the discussion with respect to FIG. 2(b), it may also be appreciated that each of strands 81, 82 and 83 may be constructed to have slightly different response curves to strain so that a wide range of strain may be measured by construction strand 81, 82 and 83 to have overlapping ferromagnetic curves.

Figure 8:
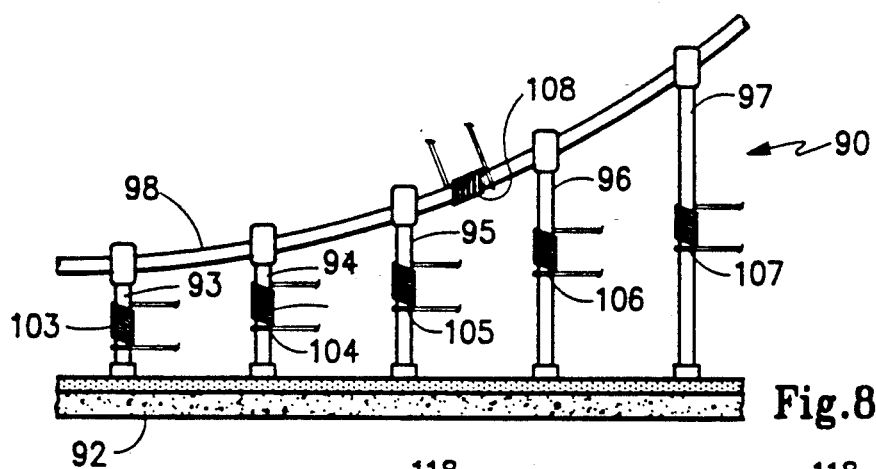
FIG. 8 is a side view in elevation showing a bridge section incorporating the strain gauge apparatus and method of the present invention.
Figure 9:
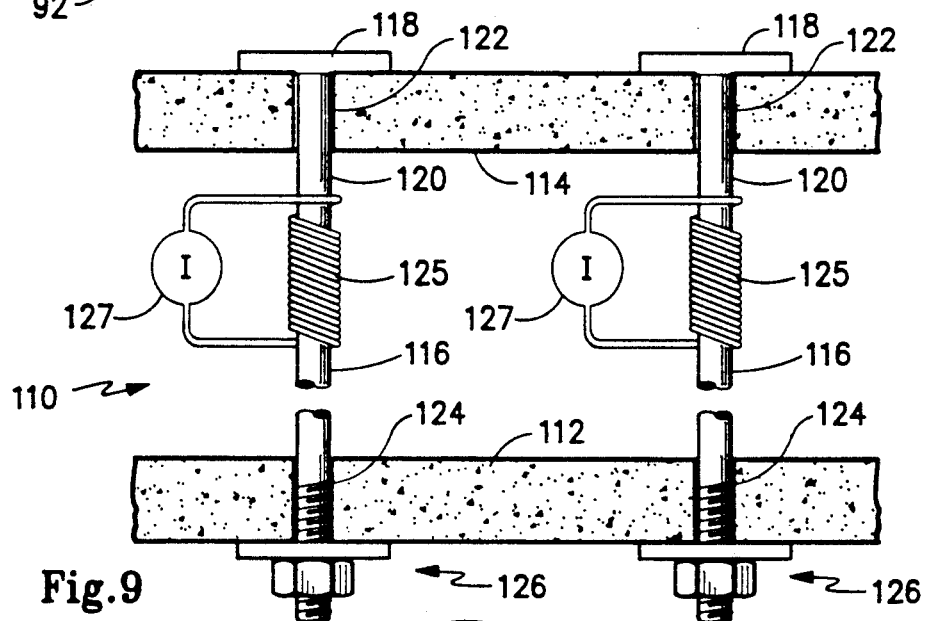
FIG. 9 is a side view and partial cross-section showing the strain gauge element according to the present invention in a bolt configuration supporting a first structural member from a second structural member.

Any of the TRIP steel elements such as shown in FIGS. 4–7, may be incorporated into a system for measuring strain on an integrated structure. In FIG. 8, for illustration purposes, a bridge 90 is shown which includes a bed 92 that is supported by a plurality of cables 93–97 from a suspension cable 98. Each of cables 93–97 have a corresponding strain gauge element 103–107 and cable 98 is provided with a strain gauge element 108. Thus, each of the respective cables may be measured for strains resulting from normal use of bridge 90 or resulting from unusual environmental strains that may result, for example, from high winds, earthquakes, and the like. These cables may be monitored for a selected degradation factor and, since the change in phase of TRIP alloy steels is irreversible, each of the strain gauge elements 103-108 measure the peak strain which occurs over an interval of time.

The present invention hence provides a simple and inexpensive technique for evaluating the integrity of the structure in the form of bridge 90. Furthermore, it should be appreciated that each of gauges 103-108 could be monitored by a common remote sensor instrument which may poll the respective strain gauge element to determine the strain on its respective support cable. Thus, it is not necessary for a strain measuring instrument to be in one-to-one correspondence with the number of strain gauge elements. Further, it is not necessary that the strain measuring instrument be locally integrated either with each respective strain gauge or with the ensemble of strain gauge elements 103-108. Rather, an independent portable meter may readily used by a technician to read the condition of cables 93-98 since the strain elements are passive. This provides the natural advantage of no power consumption except at such time that a strain measurement is being performed.

The technique noted with respect to FIG. 8 may also be used for example, with a structure 110 wherein a first horizontal member 112 is mounted for suspended support from a second horizontal member 114 by a pair of support bolts 116. Each bolt 116 has a head structure 118 and a shaft structure 120 which extends through passageways 122 in support 114 and 124 in support 112. Bolts 116 are secured at an end opposite head structures 118 by means of nut structures 126. Tension on bolts 116 due to gravitational or other loading on horizontal support 112 with respect to support 114 may be monitored when bolts 116 are formed of a TRIP alloy steel. Here, coils 125 encircle a selected portion of bolt 116 so that magnetic induction may be monitored by a measuring instrument 127.

C. Strain on Beams and Columns

It may now be understood from the foregoing discussion that one of the most convenient phase change devices according to the present invention is the use of a tensile element in the form of a TRIP steel wire or cable segment. That is, it is more convenient to measure the strain produced by axial tension due to the elongation of a TRIP steel alloy wire than measuring the compression on such a wire since the wire may buckle before fully straining under compression. Accordingly, the phase change TRIP steel alloy wire may sometimes hereinafter be referred to as a tensile element, and these tensile elements may be used to measure both the strains on structural members, such as support columns, beams and struts, due to stress. These strains measured may be both positive and negative strains resulting respectively from tension and compression.

Figure 10:
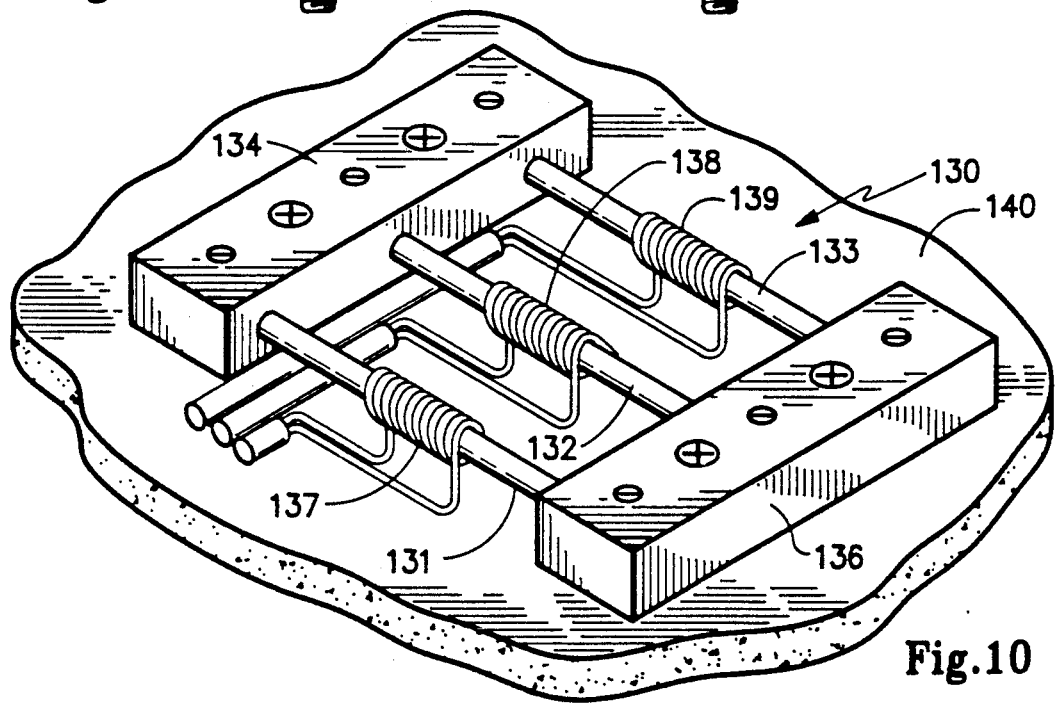
FIG. 10 is a perspective view of a strain gauge device according to the present invention having multiple ranges for the detection of tension stress.

With reference to FIG. 10, it may be seen that three tensile elements 131, 132 and 133 may be mounted between first and second mounts 134 and 136 which are affixed to a portion of structural member 140. Each of tensile elements 131-133 has associated therewith a respective coil 137, 138 and 139. Any elongation of member 140 which causes movement of mounts 134 and 136 apart from one another places stress in the form of tension on tensile elements 131-133 so that any elongation of tensile elements 131-133 is representative of the strain on structural member 140. Tensile elements 131-133 can be constructed so as to measure different ranges of strain, as described above.

Figure 11:
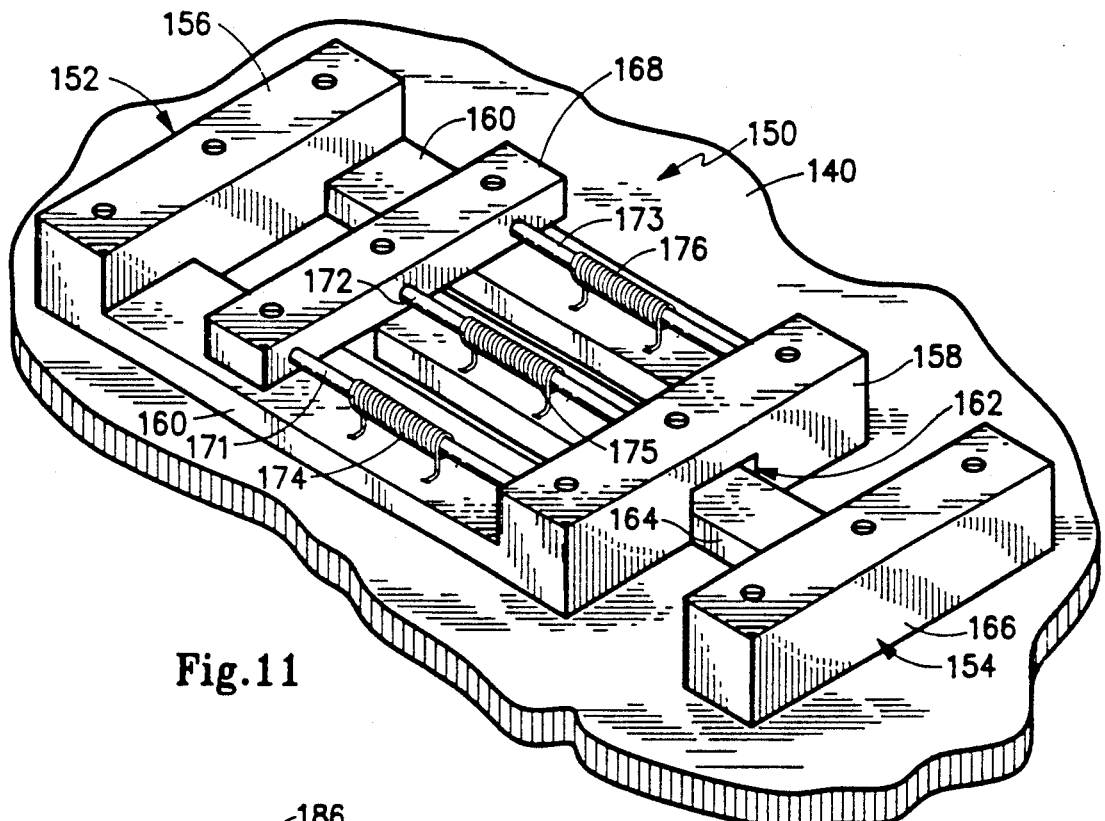
FIG. 11 is a perspective view, similar to FIG. 10, but showing a strain gauge construction for measuring compression stress over multiple ranges.

Similarly, as is shown in FIG. 11, structural member 140 may be monitored for strain resulting from compression by means of the strain device 150 wherein a pair of mounts 152 and 154 are provided and are affixed to structural member 140. Mounts 152 and 154 are constructed in any convenient manner so that relative movement of mounts 152 and 154 toward one another creates tension on tensile elements 171, 172 and 173. As is shown, for example, in FIG. 11, mount 152 has a base portion 156 to which a crossbar 158 is rigidly secured by arms 160. An opening 162 is formed in crossbar 158 which slideably receives arm 164 which is rigidly secured to base 166 of mount 154. Opposite mount 154 is formed a T-shaped crossbar 168 which is rigidly secured to arm 164 so that, when base portions 156 and 166 move toward one another, under compressive forces, crossbar 158 and T-shaped crossbar 168 separate from one another to elongate tensile elements 171-173 so that the corresponding ferromagnetic phase change may be measured by coils 174-176 associated therewith.

Figure 12:
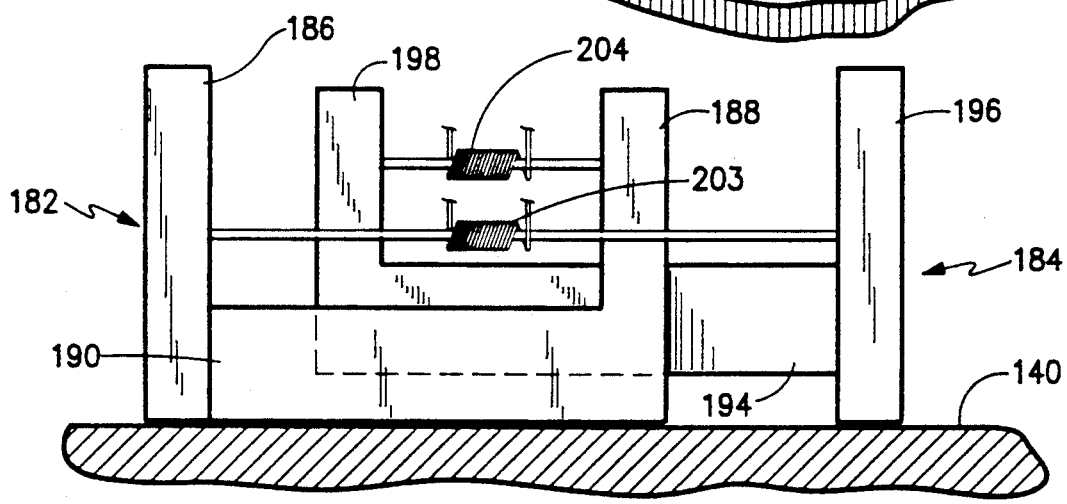
FIG. 12 is a side view in elevation showing a strain gauge device for measuring both tension and compression.
Figure 13:
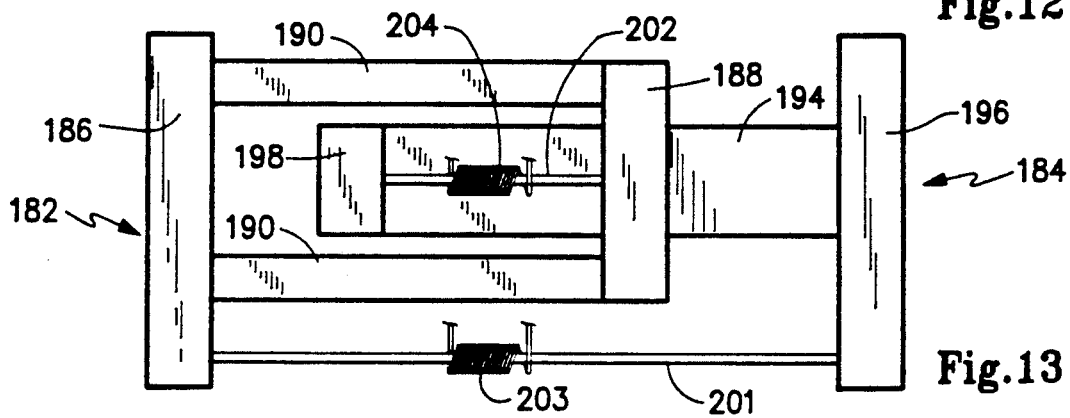
FIG. 13 is a top plan view of the strain gauge device of FIG. 12.
Figure 14:
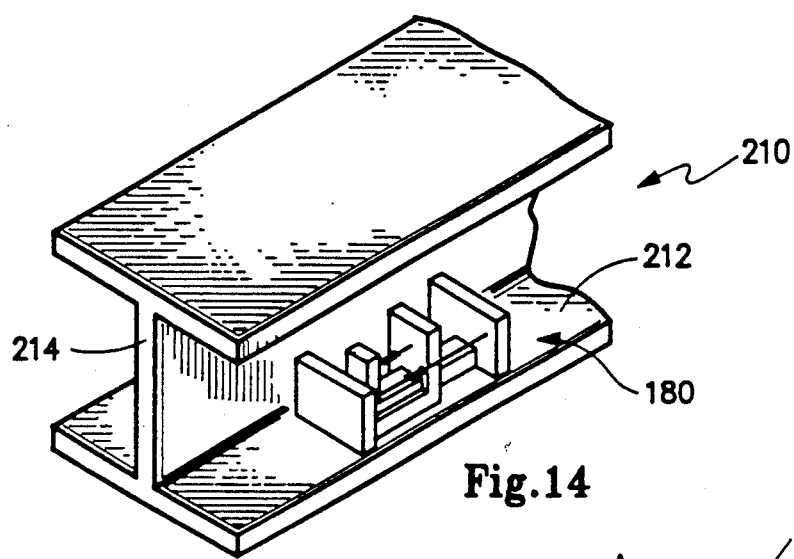
FIG. 14 is a perspective view showing the strain gauge device of FIGS. 12 and 13 mounted on a beam.

A dual stage strain gauge, according to the present invention, is shown in FIGS. 12-14, which is an incorporation of the structures shown in FIGS. 10 and 11 into a single unit. In FIG. 12, it may be seen that a pair of mounts 182 and 184 are secured to structural member 140. Mount 182 has a base 186 and a crossbar section 188 rigidly secured thereto by arms 190. Similarly, mount 184 has a base 196 and a crossbar section 198 which is rigidly secured thereto by means of arm 194. A first tensile element 201 extends directly between base portion 186 of mount 182 and base portion 196 of mount 184. a second tensile element 202 extends between crossbars 188 and 198. Tensile element 201 has an associated coil 203 while tensile element 202 has an associated wire coil 204 for purposes of measuring the change in ferromagnetism thereof by means of the change in magnetic inductance as described above. Thus, it should be appreciated that, under tension forces that may elongate structural member 140, tensile element 201 is elongated thereby monitoring strain induced by tension forces whereas compressive forces place tension on tensile element 202 so that the elongation thereof measures strain due to the compressive forces on structural member 140.

Figure 15:
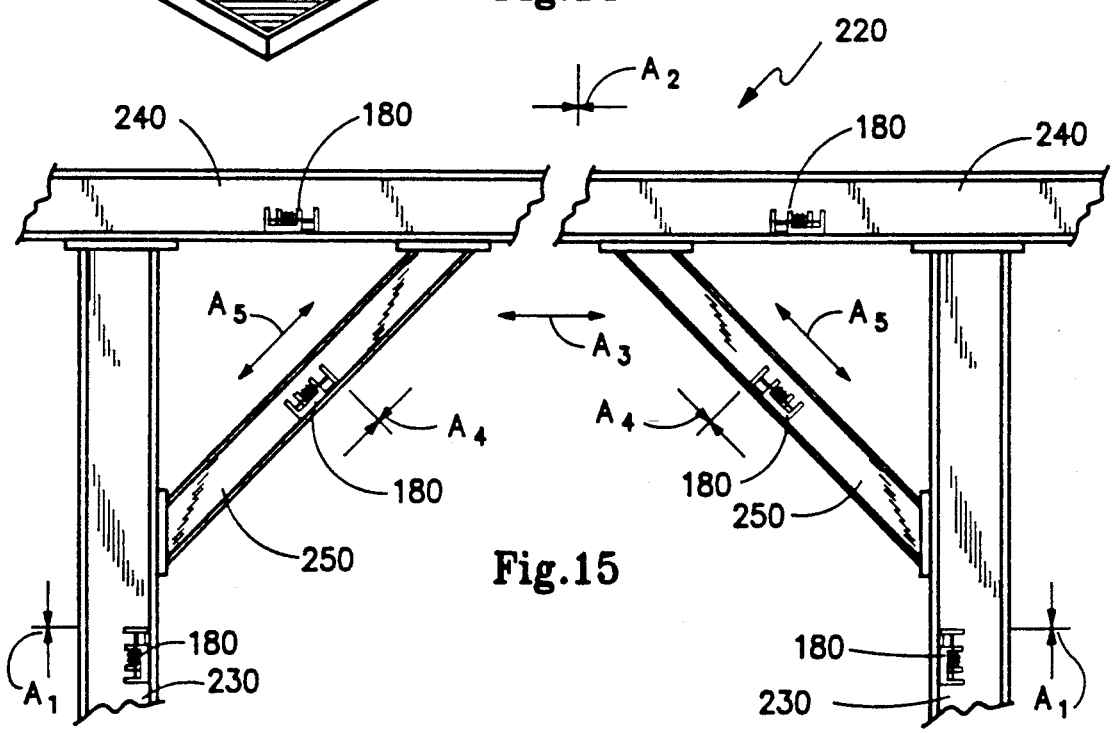
FIG. 15 is a side view in elevation showing a structure using beams, columns and struts and incorporating strain gauges for measurement of strain thereon.

As is shown in FIG. 14, strain gauge 180 may be mounted to a primary structural member such as I-beam 210, for example, on flange portion 212 thereof. It should be appreciated, however, that gauge unit 180 could be mounted to central web 214 or to any other convenient portion of a beam 210. Where a structure is formed out of a plurality of beams, as is shown in FIG. 15, the various strain gauge units 180 may be provided to monitor the structure 220. Here, it may be seen that structure 220 includes a plurality of columns, such as columns 230 which support beams such as representative beam 240 that may also be supported by struts, such as struts 250. Arrows $A_1$-$A_5$ show the relative compressive and tension forces which would normally be exerted on structure 220 and which may be monitored by strained gauge units of 180 mounted at convenient locations thereon.

D. Strain Measurement of Plates, Skins and Shells

Figures 16, 17:
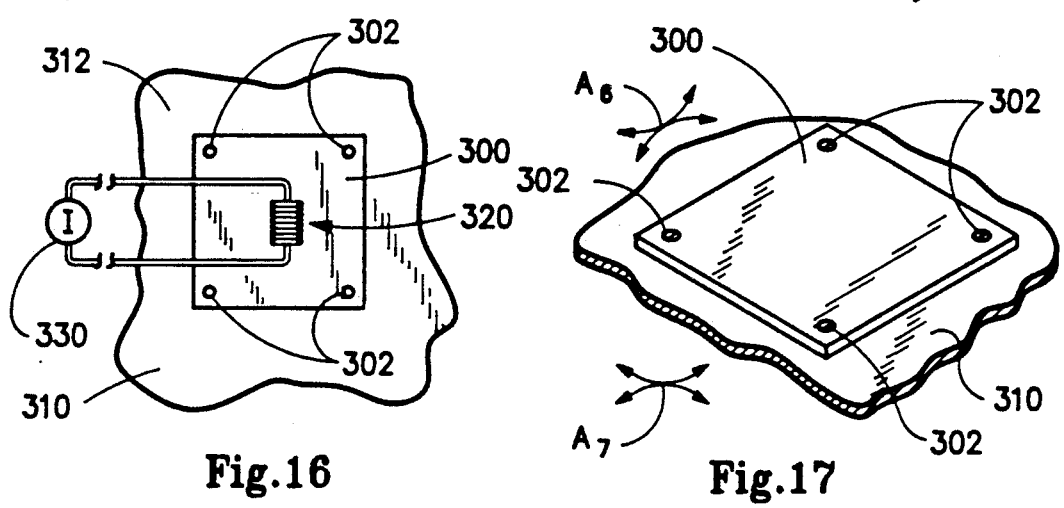
FIG. 16 is a top plan view of an alternate embodiment of a strain gauge element in the form of a plate.
FIG. 17 is a perspective view of the strain element shown in FIG. 16.

FIGS. 16-20 show elements for measuring strain on plates, skins and shells which typically will allow for measuring strains resulting from more than simple onedirectional forces. Important to these types of elements, and the methodology contemplated herein, is the fact that it is not necessary to encompass or to encircle the phase change material with a wire coil. Rather, an induction measuring coil may non-intrusively measure the ferromagnetism of a TRIP steel alloy plate, skin, coating or web simply by being placed in sufficient proximity thereto, depending on the sensitivity of the induction measuring instrument. Thus, for example, as is shown in FIG. 16, a plate 300 of TRIP steel alloy material may be secured, for example, by bolts 302 to the surface 312 of a structural member 310. An electromagnetic wire coil 320 may then selectively be placed in proximity to plate 300 and the ferromagnetic induction measured by means of instrument 330. Any changes to the ferromagnetic property of plate 300 may be monitored by instrument 330 to read the strain on plate 300 resulting from strain on structural member 310. Thus, as is shown in FIG. 17, strains resulting from on structural member 310 due to stress forces which either compress, expand or deflect plate 300 may be monitored. Here, the deflective forces are graphically shown by arrows $A_6$ and $A_7$. Plates, such as plates 300, can either be attached to a structural member, such as masonry wall, a structural support panel and the like.

Figure 18:
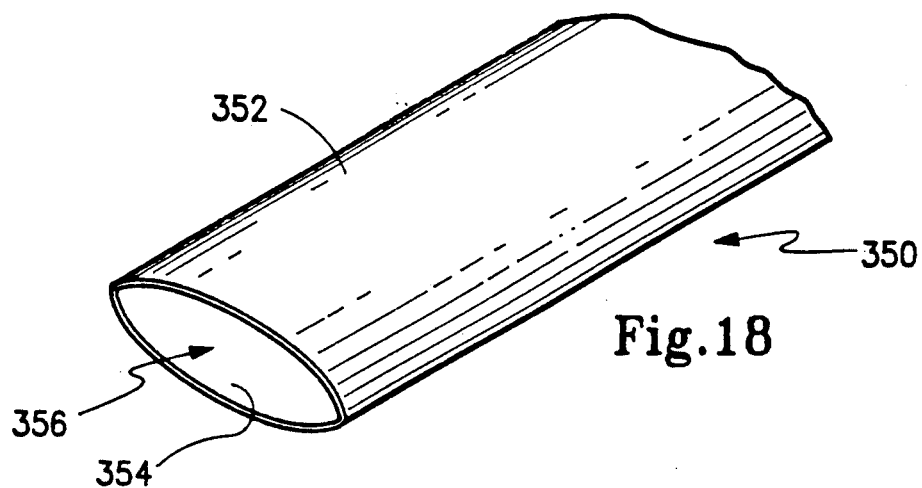
FIG. 18 is a perspective view of a shell formed out of a phase change material according to the present invention.
Figure 19:
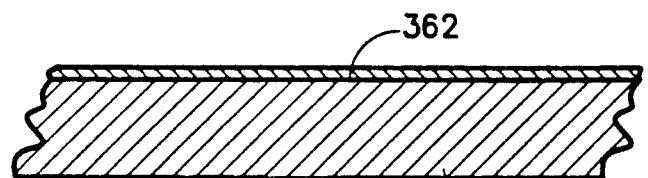
FIG. 19 is a side view in cross-section showing the strain element of the present invention as a coating on a substrate.
Figure 20:
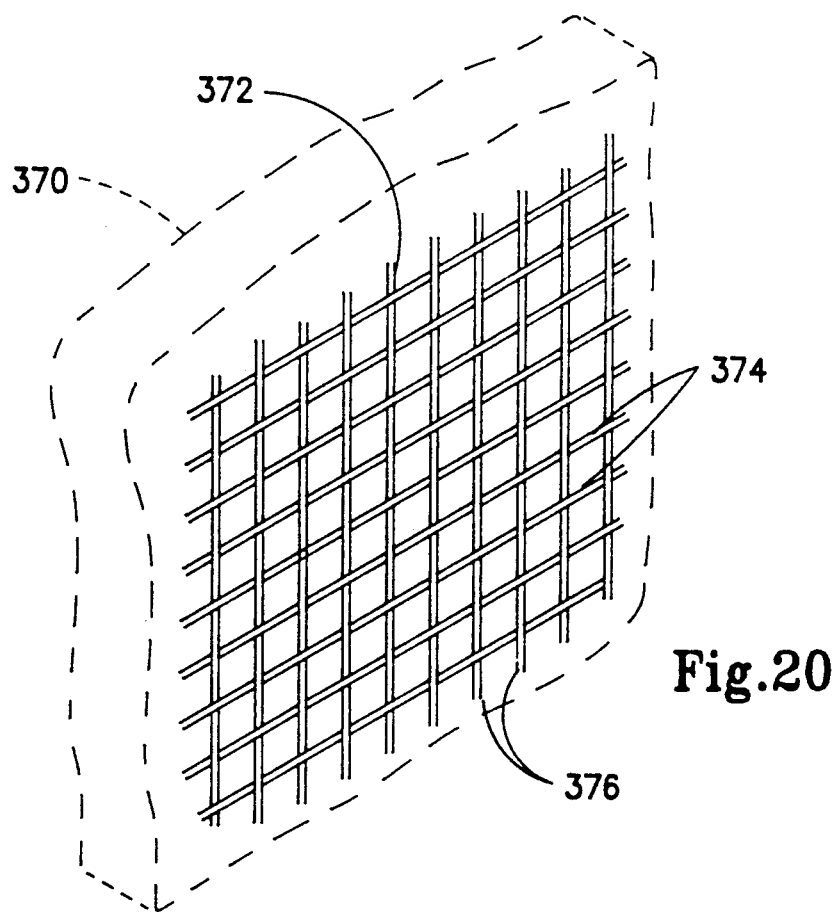
FIG. 20 is a perspective view of a strain element web adapted to be embedded within a structural member according to another embodiment of the present invention with the structural member shown in phantom.

As is shown in FIG. 18, the TRIP alloy steel materials can even be used to construct a shell such as shell 350. Here, shell 350 is shown to comprise an upper panel section 352 and a lower panel section 354 that enclose an interior 356. This shell 350 may be formed entirely out of a TRIP steel alloy or, as is shown in FIG. 19, a panel may be formed by a substrate 360 with a TRIP alloy steel coating 362. Alternately, as is shown in FIG. 20, a panel 370 may have an embedded web-like matrix 372 of TRIP steel wires, such as wires 374 and 376. Web-like matrix 372 may be embedded in or attached alongside the surface of an aluminum or composite shell or skin such as in an aircraft wing, boat hull, storage tank and the like. Strains resulting from compression, tension, deflection and other deformation forces may then be monitored by measuring the changes in the ferromagnetism of the shell 350, the coating 362, or the web like matrix 370, similarly to the measurement of the change in ferromagnetism of plate 300. It should further be appreciated that, even where a plate or web like matrix is embedded in the structural member, the change in ferromagnetism thereof may be measured non-intrusively through the material by means of an inductive coil placed in proximity to the surface of the structural member. Also, since the TRIP alloy steel has high strength and toughness, the material itself lends strength to the structural material. However, where some flexibility of the structural member is desired, for example, in an aircraft wing, it is envisioned that either the web-like wires shown in FIG. 20 or a relatively thin coating such as shown in FIG. 19 will be the preferred construction.

E. Measurement of Relative Deflection and Monitoring Systems

The tensile elements according to the present invention may also be incorporated into a monitoring system that is operative to measure strain on structural members which are joined together as an integrated structure in order to monitor the integrity of the structure for degradation resulting from stress. The monitoring of a plurality of structural members interconnected as a structure was discussed, somewhat, with reference to FIG. 15. In that figure, a plurality of strain gauges 180 were placed on different structural members to monitor stress induced deformations.

Figure 21:
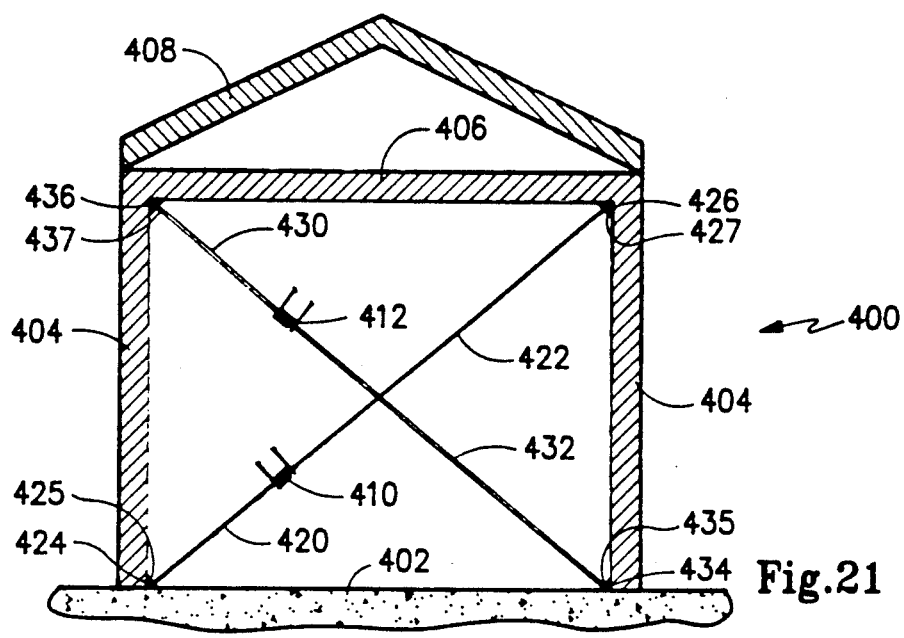
FIG. 21 is a cross-sectional side view showing the strain gauges of the present invention utilizing the methodology to measure strain and displacement of a framework.
Figure 22:
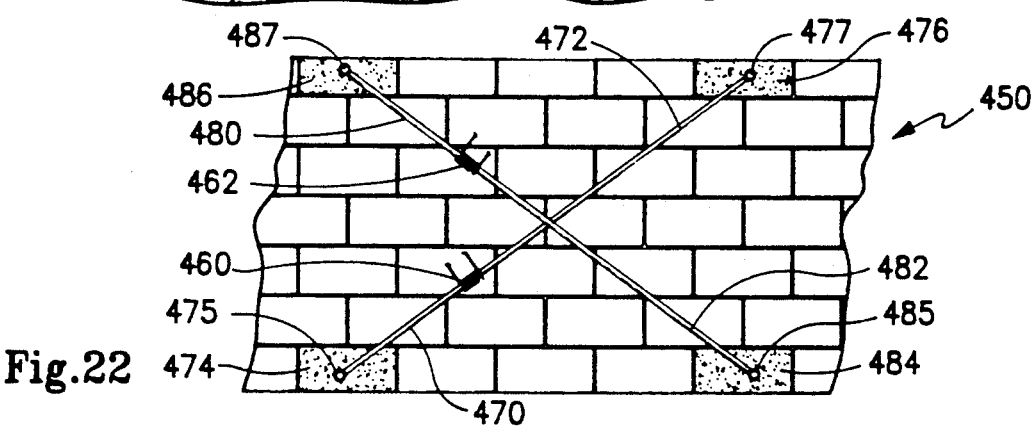
FIG. 22 is a side view showing the strain and displacement measurement apparatus and technique of FIG. 21 in use with a masonry wall.

In a more simplistic manner, however, and with reference to FIGS. 21 and 22, it may be seen that two-dimensional structural deformation may be monitored by the tensile elements and strain gauges according to the present invention. In FIG. 21, a representative frame structure 400 is shown and includes a substrate or foundation 402 on which is erected a pair of vertical sidewalls 404, a top wall 406 and a roof structure 408. Deformation of the structure, in two-dimensions, as opposed to the strain on any particular structural element, may be monitored by a pair of tensile elements 410 and 412. Tensile element 410 is connected by means of cable sections 420 and 422 to opposite corners 424 and 426 of structure 400. Likewise, tensile element 412 is connected by cable sections 430 and 432 to opposite corners 434 and 436 of structure 400. Any deformation of the rectangular cross-section defined by foundation 402, sidewalls 404 and top wall 406 will result in an axial stress on one of tensile elements 410, 412. This axial stress in turn, will strain the phase change material comprising the tensile element, as described above, so that the amount of phase will be indicative of the stress. Therefore, by knowing the original dimensions of the system, not only can the strain event be discovered, but also the magnitude of dislocation between anchor points 425, 427 and between anchor points 435 and 437 may be determined.

Similarly, with respect to FIG. 22, a masonry wall 450 is shown wherein a pair of tensile elements 460 and 462 are connected to diagonal anchor points. Thus, for example, tensile element 460 is mounted by a cable segment 470 to anchor block 474 by an anchor 475. A second cable segment 472 anchors tensile element 460 to anchor block 476 by way of anchor 477. Tensile element 462 includes a cable segment 480 which anchors one side of tensile element 462 to anchor block 486 by means of anchor 487, and cable segment 482 anchors tensile block 462 to anchor block 484 by means of anchor 485. Again, any deformation of masonry wall 450 will cause a shift in the blocks 474, 476, 484 and 486, and the shift will place stress on one or both tensile elements 460, 462. This stress induces a strain that is again quantified by the amount of phase change in the material forming tensile elements 460, 462.

Figure 23:
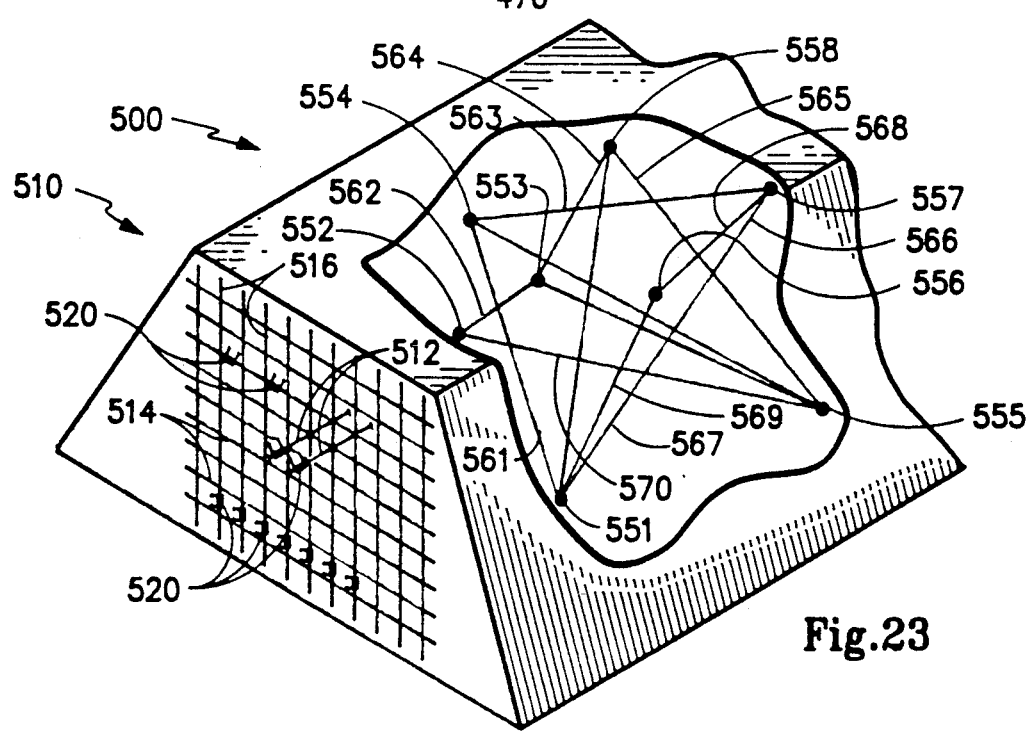
FIG. 23 is a perspective view in cross-section and broken away showing three dimensional displacement and strain measurement in a masonry structure.

FIG. 23 shows a representative integrated structure 500 which may be, for example, a dam or other large concrete work, road bed or substrate medium. In FIG. 23, two alternate systems are shown for monitoring strain on structure 500. As is common with such concrete works, a matrix of rebar is provided which is cast into the concrete. Thus, as is shown in FIG. 23, rebar matrix 510 includes longitudinal rebars 512, transverse rebars 514 and vertical rebars 516. Strain gauge elements 520 may be mounted on selected ones of these rebars so that three-dimensional stress may be monitored by the strains on the rebar elements. From the teachings from the embodiments set forth above, it should be understood that the rebars 512, 514 and 516 could, themselves, be constructed of a TRIP steel alloy so that it would simply be necessary to encircle a portion of the rebar element by a wire coil similar to that shown in FIG. 5 to monitor the status of the phase change material. This can be accomplished by wiring an external magnetic induction measuring instrument to the coils. Alternately, where rebars 512, 514 and 516 are not produced from phase change material, a tensile gauge, such as shown in FIG. 4, may be used to monitor strain on the respective rebars, with such tensile elements being mounted to the selected rebar elements in any convenient manner.

Alternately, as shown in FIG. 23, anchors 551–558 may be cast within structure 500 with these anchor points being connected, as desired, by cable structures such as cables 561–570. Again, each of these cables may be provided with tensile elements, similar to those shown in FIGS. 21 and 22, or cables 561–570 can be constructed by phase change material and provided with the magnetic induction coil or other phase change measurement device. The system shown in FIG. 23 would thus allow determination of three-dimensional deformations caused by strain on structure 500.

FIG. 24 shows a system operative to measure phase change on a structure, such as a building 600. Here, a central monitor station 610 is provided that is connected by a wires 611–615 to a plurality of tensile strain gauge elements 621–625. These monitors 621–625 can be simple tensile elements cast, for example, in columns 631, 632 and 633 but can also be gauged rebars, strain gauges such as strain gauges 180 shown in FIG. 15, or any ottert ype of strain gauge encompassed within this invention. Thati is,, it should be understood that the variety of tensile elements and strain gauges may be of substantial variety within the scope of the invention, requiring only that the strain gauge or tensile element be constructed of a phase change material of a material that changes phase in response to strain. Central monitor station 610 may include instrumentation to monitor strain on the various strain gauges or tensile elements. In addition, an alarm 650 can be provided to produce an audible alarm if a selected threshold strain is reached. Alternatively, central station 610 could provide a simple junction box for the wiring ensembles connected to the tensile elements or strain gauges. In this embodiment, a technician would simply bring instrumentation to central station 610 and electrically connect the instrumentation to poll the ensemble of strain gauge elements. In the first instance, the system would be an active system that would be power consumptive, but, in the second embodiment of this system the system would be passive and only consume power when the technician polled the ensemble of strain gauge elements. Accordingly, after a natural disaster, a technician or engineer could quickly ascertain the integrity of the building, despite the lack of power and regardless of the presence of visible indications of damage. This would be done simply by connecting suitable instrumentation at central monitor station 610. Since each of the tensile elements monitor peak strain, degradation of the structure 600 would be registered despite the fact that the building had been returned to somewhat its original state.

F. Pipe Systems

The above description has focused primarily on structures, such as buildings, dams, bridges and the like as well as aircraft and machinery with the discussion of skins, shells and coatings. It should be appreciated that other structures, such as storage tanks and piping systems may advantageously use the technology disclosed in this application, and it is anticipated that this invention will have tremedous utility for refineries, large chemical production plants, pipelines, storage facilities and the like. Thus, by way of example and not limitation, FIGS. 25–27 show different embodiments of the use of the present invention with pipes. It should be understood that, the discussion with respect to plates, skins and shells has particular application to this field. In addition to that discussion set forth above, it may be seen in the embodiment shown in FIG. 25 that a pipe 700 has a sidewall 702 in which is embedded a plurality of longitudinal TRIP steel wires 710 located at equidistantly spaced circumferential locations around the longitudinal axis Z. Any stretching or bending of pipe 700 would result in placing tension on one or more of wires 710 which, due to their construction of TRIP alloy steel or other phase change material, would result in a phase change that would be detectable with suitable instrumentation. Where the phase change of wires 710 is one from a non-ferromagnetic state to a ferromagnetic state, a magnetic induction coil could be placed along the circumferential surface 704 of pipe 700 and localized regions of degradation determined.

Instead of embedding a pipe, such as pipe 700, with TRIP steel alloy wires, as shown in FIG. 25, it would also be possible to make a strain gauge that would be attachable exteriorly of a pipe. Thus, as is shown in FIG. 26, for example, a pipe 720 has a first mount 730 and a second mount 732 secured circumferentially therearound. A plurality of tensile elements, such as TRIP steel wires 740 are mounted between mounts 730 and 732 so that any strain on wires 740, caused by the stress from bending or elongating pipe 720 would be measured by the change in magnetic inductance of wires 740 by means of inductive coil 742. Torquing forces, however, would not as readily be monitored with the system shown in FIG. 26 so that, as shown in FIG. 27, a pipe 720 may be provided with a torque measuring device comprising a pair of mounts 750 and 752. A tensile element 760 extends between arms 754 and 756 of mount 750 and, arm 758, attached to mount 752, connects to a central portion of tensile element 760. Thus, any torque forces caused by relative rotation, shown by arrows $A_8$ and $A_9$ will strain tensile element 760 the phase change of which will again be monitored by coil 762. Thus, in addition to stretching or bending, torque or twisting forces can be monitored for pipe 730.

G. Methodology

From the foregoing description of the apparatus according to the various embodiments of the present invention, the broad methodologies taught by the present invention, which have heretofore not been recognized, may be readily appreciated by the originally skilled person in this field having read this patent disclosure. For sake of summary, it may be seen that the method according to the preferred embodiment of the present invention contemplates a method of measuring strain in a structure, which may broadly include a substrate media, where the strain results from stress on the system, comprises two general processing steps. First, a piece of material is incorporated into the structure or substrate wherein the piece of material is formed of a substance which undergoes a change in phase in response to strain in a manner such that the piece of material will be strained correspondingly to the strain to be measured in the structure or substrate. Second, the magnitude of phase change in that piece of material is measured after stress on the structure or substrate in order to produce an indicator of the strain resulting from the stress. The method according to the present invention contemplates that the piece of material may itself be incorporated into the structure as a structural member. Alternately, the step of incorporating the piece of material may be accomplished by embedding the piece of material into a portion of the structure. As a further alternative, the step of incorporting may be accomplished by attaching a piece of material to a structural member of the structure. Where structural deformation or substrate movement is to be monitored, the piece of material is preferably in the form of a tensile element so that the step of incorporating is accomplished by providing spaced-apart anchors securing opposite ends of the tensile element to spaced locations within the structure or substrate. Again, these anchors may be attached exteriorly to the structure or embedded within the structure. Finally, as should be well recognized, in the preferred form the present invention the piece of material is one that changes phase from a non-ferromagnetic state to a ferromagnetic state in response to strain and the step of measuring is accomplished by measuring a change in magnetic inductance of the material.

H. Conclusion

In conclusion, it should now be recognized that the apparatus and method according to the present invention provides a new and different approach to measuring strain that has not heretofore been recognized. While a specific example using TRIP steel alloys has been described, it is anticipated that other phase change materials could be substituted. Indeed, phase changes other than the change in ferromagnetic state are contemplated, and various instrumentation, other than magnetic inductance measurement, may be employed to detect a change in phase. Likewise, while the foregoing disclosure describes specific strain gauge assemblies, it should be understood that a variety of different mounting structures may be used to develop strain gauges out of tensile elements, compressive rods, plates, skins, coatings and a host of others, without departing from the inventive concepts of this invention.

Accordingly, the present invention has been described with some degree of particularity directed to the preferred embodiments of the present invention. It should be appreciated, though, that the present invention is defined by the following claims construed in light of the prior art so that modifications or changes may be made to the embodiments of the present invention without departing from the inventive concepts contained herein.

We claim:

1. A device for measuring mechanical strain on a structural member, comprising:
   (a) a piece of material formed out of a substance that changes phase in response to strain;
   (b) means for securing said piece of material to said structural element whereby stress on the structural member causes stain on said piece of material; and
   (c) means for measuring change in the phase of said piece of material.

2. A device according to claim 1 wherein said substance changes from a metastable phase to a more stable phase in response to strain.

3. A device according to claim 1 wherein the change in phase is irreversible whereby said device is operative to measure a peak strain on said structural member over a period of time.

4. A device according to claim 1 wherein said piece of material is part of said structural member.

5. A device according to claim 1 wherein said piece of material is embedded in said structural member.

6. A device according to claim 1 wherein said piece of material is a coating on a portion of said structural material.

7. A device according to claim 1 wherein said piece of material is a fastener associated with said structural member and operative to secure said structural member to another object.

8. A device according to claim 1 wherein said piece of material is a tensile element mounted alongside a surface portion of said structural member.

9. A device according to claim 1 wherein said substance is one in which the change in phase is manifest by a change in a magnetic property.

10. A device according to claim 9 wherein said substance is a TRIP alloy steel.

11. A device according to claim 9 wherein said means for measuring a change in the magnetic property includes an electrically conductive coil associated with said piece of material and circuit means for measuring magnetic inductance of said coil.

12. A device according to claim 11 wherein said coil is secured relative to said piece of material at a location proximate thereto.

13. A device according to claim 11 wherein said coil is independent of said piece of material and movable from a remote location to a location proximate said piece of material.

14. A device according to claim 9 wherein said piece of material is in the form of a wire.

15. A device according to claim 14 including a plurality of wires organized in a web-like ensemble.

16. A device according to claim 9 wherein said piece of material is in the form of a plate.

17. A strain gauge apparatus adapted to be secured to a structural member of a structural system and operative to measure strain on said structural member, comprising:
   (a) a first mount adapted to be secured to said structural member at a first location;
   (b) a second mount adapted to be secured to said structural member at a second location, said first and second mounts movable with respect to one another in response to stress on said structural member;
   (c) a piece of material formed out of a substance that changes phase when strained;
   (d) means for securing said piece of material to said first and second mounts whereby relative movement therebetween strains said piece of material; and
   (e) means for measuring a phase change in said piece of material.

18. A strain gauge apparatus according to claim 17 wherein the phase change is a change in the magnetic property of said substance.

19. A strain gauge apparatus according to claim 18 wherein the phase change is from a non-ferromagnetic state to a ferromagnetic state.

20. A strain gauge apparatus according to claim 19 wherein said piece of material is formed out of TRIP alloy steel.

21. A strain gauge apparatus according to claim 17 wherein said piece of material is configured as a tensile element, said first and second mounts configured to apply tension to said tensile element when said structural material is strained.

22. A strain gauge apparatus according to claim 21 including a plurality of pieces of material, each said piece being configured as an elongated wire, at least some of said pieces of material being tuned to respond to different magnitudes of strain.

23. A strain gauge apparatus according to claim 21 wherein relative movement of said first and second mounts toward one another applies tension to said tensile element.

24. A strain gauge apparatus according to claim 21 wherein relative movement of said first and second mounts away from one another applies tension to said tensile element.

25. A strain gauge apparatus according to claim 21 wherein at least two tensile elements are secured to said first and second mounts, said first and second mounts configured so that relative movement of said first and second mounts toward one another applies tension to a first one of said tensile elements and relative movement of first and second mounts away from one another applies tension to a second one of said tensile elements.

26. A strain gauge apparatus according to claim 21 wherein at least two tensile elements are secured to said first and second mounts and oriented with respect to one another at a non-zero angle.

27. A strain gauge apparatus according to claim 21 wherein said tensile element is a length of TRIP alloy steel and wherein said means for measuring phase change includes a conductive coil surrounding said tensile element and means for measuring magnetic inductance of said conductive coil.

28. A strain gauge apparatus according to claim 21 wherein said tensile element comprises a fastener operative to interconnect two structural members of said structural system together.

29. A strain gauge apparatus according to claim 21 wherein said tensile element defines a structural member in said structural system.

30. A strain gauge apparatus according to claim 21 operative to measure strain in an elongate structural member having a longitudinal axis and a circumference and including a plurality of first tensile elements each oriented longitudinally of said elongate structural member and spaced circumferentially from one another around the circumference thereof.

31. A strain gauge apparatus according to claim 30 including a second tensile element oriented transversely to the longitudinal axis.

32. A strain gauge apparatus according to claim 17 wherein said piece of material is configured as a plate-like element.

33. A strain gauge apparatus according to claim 17 wherein said substance is one where the phase change in response to a strain force is from a metastable state to a more stable state.

34. A system operative to measure strain on structural members joined together in a structure whereby degradation resulting from stress may be evaluated, comprising:
(a) a plurality of detection elements disposed at selected locations throughout said structure and connected to the structural members thereof whereby stress on the structural members strains respective detection elements, each said detection element including a material that changes phase in response to strain; and
(b) means associated with said detection elements for measuring the change in phase thereof.

35. A system according to claim 34 wherein said detection elements are embedded within said structure.

36. A system according to claim 35 wherein said means for measuring the change in phase includes a detector located externally of said structural members, said detector including interrogation means for generating an interrogation signal that is transmitted though the respective structural members to said detection elements, said interrogation signal being of such character as to be affected by phase changes in said material to define a modified signal, and including receiver means for receiving said modified signal whereby change in phase is determined.

37. A system according to claim 34 wherein at least some of said detection elements are connected to said structure at monitor points to define dislocation monitor elements whereby said dislocation monitor elements are strained by movement of the monitor points relative to one another so that the change in phase indicates dislocation of said monitor points.

38. A system according to claim 37 wherein said material changes phase proportionally to the magnitude of strain whereby said modified signal indicates the quantative amount of dislocation.

39. A system according to claim 37 wherein said dislocation monitor elements are organized to monitor deformation of said structure in two dimensions.

40. A system according to claim 37 wherein said dislocation monitor elements are organized to monitor deformation of said structure in three dimensions.

41. A system according to claim 34 wherein said means for measuring the change in phase is associated with a central monitor station and includes interrogation means for generating an interrogation signal that is transmitted to said detection elements, said interrogation signal being of such character as to be affected by phase changes in the material of a respective detection element as a modified signal, receiver means for receiving the modified signals and output means for generating output indicative of phase change of a respective detection element in response to the corresponding modified signal.

42. A system device according to claim 41 wherein said means for measuring phase change includes alarm means for generating an alarm signal when a detected strain on the structural members exceeds a selected magnitude.

43. A method of measuring strain in a structure resulting from stress, comprising the steps of:
(a) incorporating into said structure a piece of material formed of a substance which undergoes a change in phase in response to strain in a manner such that the piece of material will be strained correspondingly to the strain to be measured in the structure; and
(b) measuring the magnitude of phase change in said piece of material after stress on said structure as an indicator of the strain resulting therefrom.

44. A method according to claim 43 wherein said piece of material is incorporated into said structure as a structural member thereof.

45. A method according to claim 43 wherein said step of incorporating is accomplished by embedding said piece of material into a portion of the structure.

46. A method according to claim 43 wherein said step of incorporating is accomplished by attaching said piece of material to a structural member thereof.

47. A method according to claim 43 wherein said piece of material is in the form of a tensile element, said step of incorporating is accomplished by providing spaced-apart anchors securing opposite ends of said tensile element to spaced locations said structure.

48. A method according to claim 47 wherein said anchors and said tensile element are embedded in said structure.

49. A method according to claim 43 wherein said material changes phase from a non-ferromagnetic state to a ferromagnetic state in response to strain, said step of measuring is accomplished by measuring a change in magnetic inductance of said material.

* * * * *